(12) United States Patent
Onoda

(10) Patent No.: US 6,187,242 B1
(45) Date of Patent: *Feb. 13, 2001

(54) CONNECTOR MOLDING METHOD

(75) Inventor: Katsuhiko Onoda, Shizuoka (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/146,242

(22) Filed: Sep. 3, 1998

(30) Foreign Application Priority Data

Sep. 3, 1997 (JP) .................................................. 9-238510

(51) Int. Cl.⁷ ...................................................... B28B 7/22
(52) U.S. Cl. ............................ 264/255; 264/261; 264/277
(58) Field of Search ..................................... 264/275, 255, 264/271.1, 250, 277, 263, 274, 261; 174/50.52, 50.53, 68.1, 68.2; 29/825

(56) References Cited

U.S. PATENT DOCUMENTS

| 5,201,883 | * | 4/1993 | Atoh et al. ........................ 264/272.15 |
| 5,527,502 | * | 6/1996 | Kiuchi et al. ........................... 264/277 |
| 5,709,559 | * | 1/1998 | Fujitani et al. ....................... 439/130 |

FOREIGN PATENT DOCUMENTS

| 6-223903 | 8/1994 | (JP) . |
| 8-250193 | 9/1996 | (JP) . |

\* cited by examiner

*Primary Examiner*—Angela Ortiz
(74) *Attorney, Agent, or Firm*—Sughrue, Mion, Zinn, Macpeak & Seas, PLLC

(57) ABSTRACT

A connector molding method in which the accuracy of positioning of a plurality of metal terminals is enhanced, and also even if part of a housing is formed into a thickened portion, a shrink mark and a warp will not develop in the molded connector. At a first stage of the connector molding method of the invention, a plurality of male metal terminals are kept insulated from one another, and in this condition these metal terminals are insert molded, thereby forming a primary molded body. Then, at a second stage, the primary molded body is properly positioned, and is insert molded, thereby forming a secondary molded body which is a final molded product (connector). In order to prevent the development of a shrink mark and a warp due to the formation of a thickened portion of the connector, a core portion of the thickened portion is formed at the time of molding the primary molded body, and a shell portion of the thickened portion, having a generally uniform thickness of 1 mm to 2 mm, is formed at the time of molding the secondary molded body. The core portion of the primary molded body is utilized for the positioning for the second molding, and therefore the male metal terminals can be positioned highly precisely.

5 Claims, 4 Drawing Sheets

CONNECTOR MOLDING METHOD

BACKGROUND OF THE INVENTION

1. Field of the Invention

This invention relates to a method of molding a connector.

The present application is based on Japanese Patent Application No. Hei. 9-238510, which is incorporated herein by reference.

2. Description of the Related Art

There have heretofore been known various methods of molding a connector used for electrical connection purposes in an electric system in an automobile and so on. For example, Unexamined Japanese Patent Publication No. Hei. 6-223903 discloses a connector having a plurality of metal terminals, and the connector that is formed by insert-molding at a time.

In the above method, however, molding the connector by a mold while accurately positioning the metal terminals in the mold may be difficult. Therefore, there is a possibility that the terminals are displaced out of position by jets of a molding material during the molding operation is formed.

SUMMARY OF THE INVENTION

With the above problems in view, it is an object of this invention to provide a connector molding method in which the accuracy of the positioning of a plurality of metal terminals is enhanced.

According to the present invention, there is provided a method of molding a connector comprising a housing having fitting recesses formed respectively in opposite ends thereof for respectively receiving mating connectors, and a plurality of male metal terminals each of which is embedded in the housing, and has connection portions projecting respectively into the fitting recesses, wherein a primary molded body is molded in such a manner that the male metal terminals are kept insulated from one another, and the primary molded body is positioned, and subsequently a secondary molded body is molded on the primary molded body; wherein a core portion of a thickened portion of the housing is molded at the time of molding the primary molded body, and a shell portion of said thickened portion, having a generally uniform thickness, is molded at the time of molding the secondary molded body.

In the above method of molding the connector, the primary molded body, in which the male metal terminals are properly positioned, with the connection portions exposed from the primary molded body, is first formed. Then, the secondary molded body, in which the primary molded body is properly positioned and inserted, is molded, thereby providing a final molded product.

More specifically, the male metal terminals are held in a primary mold in such a manner that these terminals are kept out of contact with one another, that is, insulated from one another, and in this condition the primary molding is effected. Then, the primary molded body is positioned and held in a secondary mold, and in this condition the secondary molding is effected, thereby forming the secondary molded body. Accordingly, the male metal terminals can be positioned highly precisely.

Additionally, the whole of the thickened portion is not molded in at one molding step (that is, the step of forming the primary molded body or the step of forming the secondary molded body), and therefore, a shrink mark and a warp are prevented from developing in the housing. In addition, since the core portion of the primary molded body is utilized of the positioning for the secondary molding, the metal terminals can be positioned highly precisely. Therefore, the number of the defective connectors can be reduced, and the yield can be enhanced, and the connector of a high reliability can be obtained.

DETAILED DESCRIPTION OF THE PREFERRED EMBODIMENTS

Figure 4:
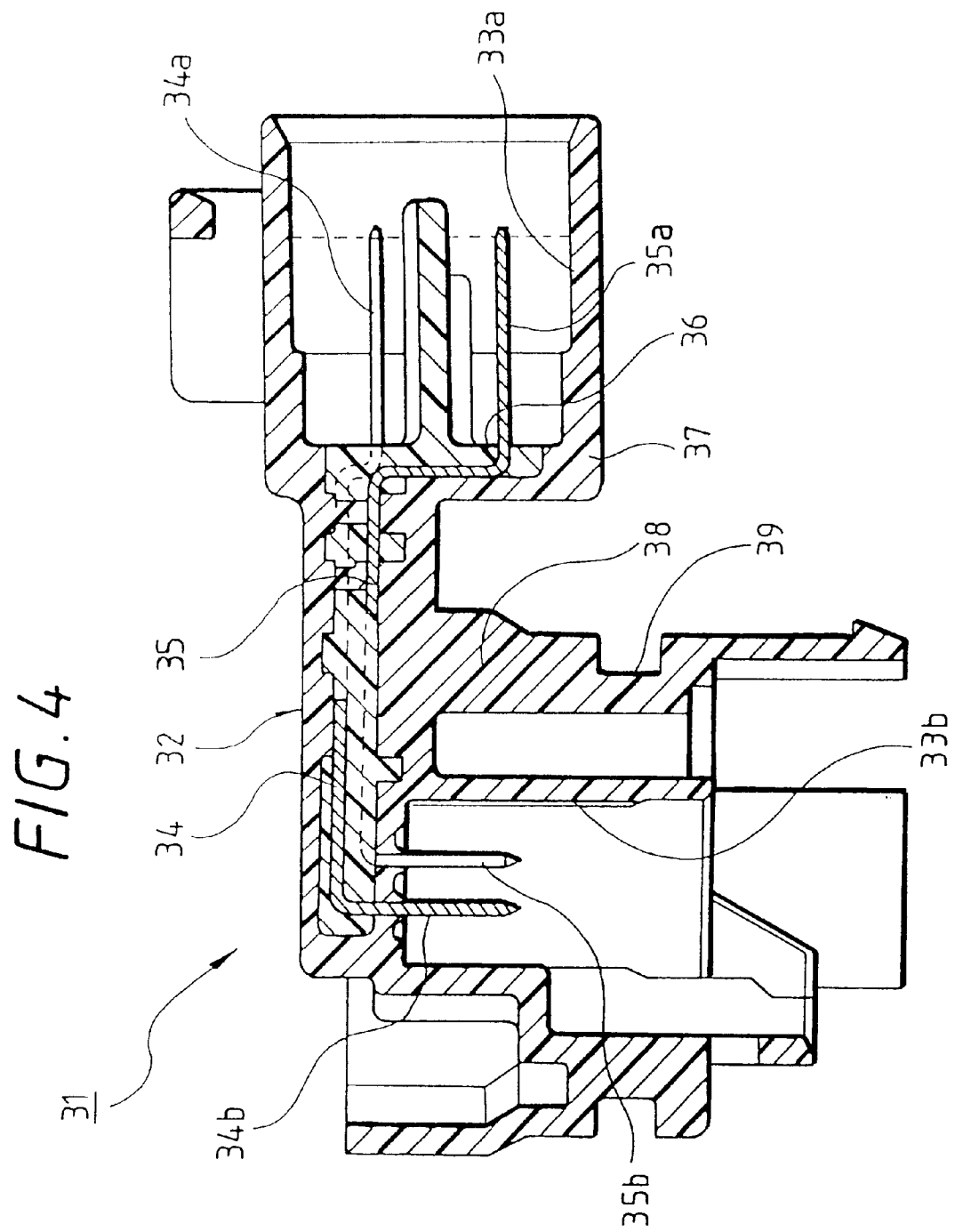
FIG. 4 is a cross-sectional view of a connector formed by a connector molding method according to a preliminary embodiment.

A connector molding method of a preliminary embodiment will now be described in detail with reference to FIG. 4.

A connector 31 is a connector for connection to a power source, and this connector is mounted on, for example, a fuel tank of an automobile.

The connector 31 includes fitting recesses 33a and 33b formed respectively in opposite ends thereof for respectively receiving mating connectors, and a plurality of male metal terminals 34 and 35 which are insert molded in a housing 32 intermediate their opposite ends, and have connection portions projecting into the fitting recesses 33a and 33b.

In the connector 31, first connection portions 34a and 35a project into the fitting recess 33a, and second connection portions 34b and 35b project into the fitting recess 33b.

For accurately positioning the male metal terminals 34 and 35 in the connector 31, a primary molded body 36, in which the plurality of male metal terminals 34 and 35 are properly positioned, with the first and second connection portions exposed from the primary molded body, is first formed. Then, a secondary molded body 37, in which the primary mold body 36 is properly positioned and inserted, is molded, thereby providing a final molded product.

More specifically, the male metal terminals 34 and 35 are held in a primary mold in such a manner that these terminals are kept out of contact with one another, that is, insulated from one another, and in this condition the primary molding is effected. Then, the primary molded product 36, formed by the primary molding, is positioned and held in a secondary mold, and in this condition the secondary molding is effected, thereby forming the secondary molded body 37.

In the above molding method, the first and second connection portions 34a and 34b of each male metal terminal 34, as well as the first and second connection portions 35a and 35b of each male metal terminal 35, project respectively from the opposite ends of the primary molded body 36, and therefore the positioning of the primary molded body 36 in the secondary mold can be easily effected, and the secondary molded body 37 can be molded, with the male metal terminals 34 and 35 kept insulated from one another.

In the above connector molding method, the positioning of the metal terminals 34 and 35 in the primary mold can be effected accurately. However, there is a possibility in that the positioning of the primary molded body in the second mold is not sufficiently effected only through the projected connection portions of the metal terminals when the pressure of injection of the molding material is high. Furthermore, if part of the secondary molded body 37 is formed into a thickened portion 38, there is a possibility that a shrink mark and a warp develop, and the housing is deformed, which may invite a problem that the number of the defective products increases, and therefore the yield is lowered.

Such a shrink mark and a warp can be prevented if the design dimension can be so set that the thickness can be made uniform on the order of 1 mm to 2 mm. However, the external dimension of the thickened portion 38 can not be freely changed due the mounting configuration of the mating connectors and the position of a seal groove 39. Further, the internal dimension of the thickened portion 38 can not be freely changed in connection with the configuration of the fitting recesses 33a and 33b for respectively receiving the mating connectors.

In order to eliminate the possibility of the problems of the preliminary embodiment, there is provided a preferred embodiment of a connector molding method of the present invention.

Figure 1:
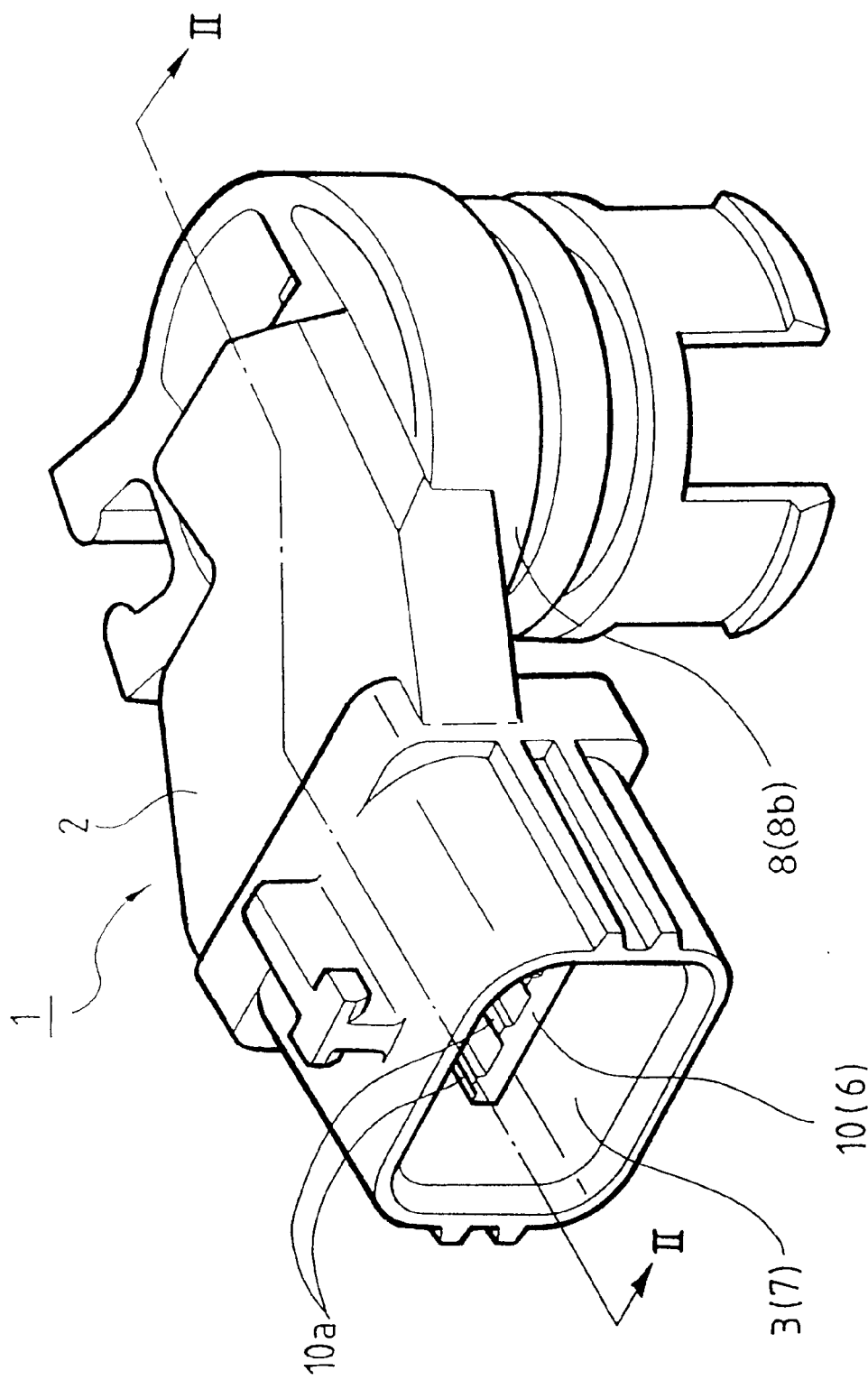
FIG. 1 is a perspective view of a connector formed by one preferred embodiment of a connector molding method of the present invention.

The preferred embodiment will now be described in detail with reference to FIGS. 1 to 3. FIG. 1 is a perspective view of a connector formed by one preferred embodiment of the connector molding method of the present invention, FIG. 2 is cross-sectional view taken along the line II—II of FIG. 1, and FIG. 3 is a perspective view of a primary molded body of FIG. 1 to be insert molded in a secondary molded body.

Figure 2:
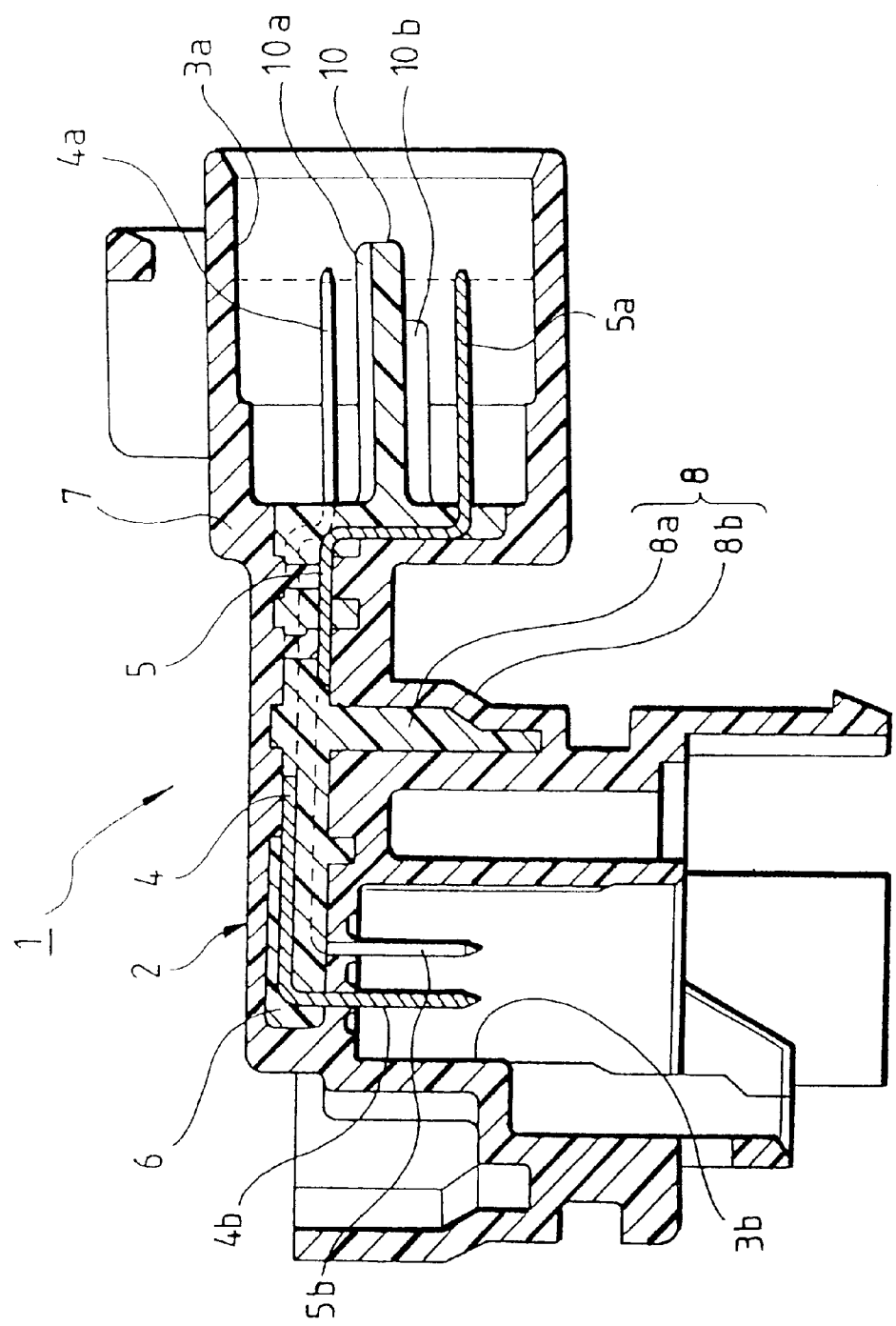
FIG. 2 is cross-sectional view taken along the line II—II of FIG. 1.

As shown in FIGS. 1 and 2, the connector 1 of this embodiment comprises a housing 2 having fitting recesses 3a and 3b formed respectively in opposite ends thereof for respectively receiving mating connectors (not shown), and a plurality of male metal terminals 4 and 5 which are insert molded in the housing 2 intermediate their opposite ends, and have first and second connection portions 4a, 5a and 4b and 5a (the first and second connection portions of each metal terminal are formed respectively at opposite ends thereof) projecting into the fitting recesses 3a and 3b.

Figure 3:
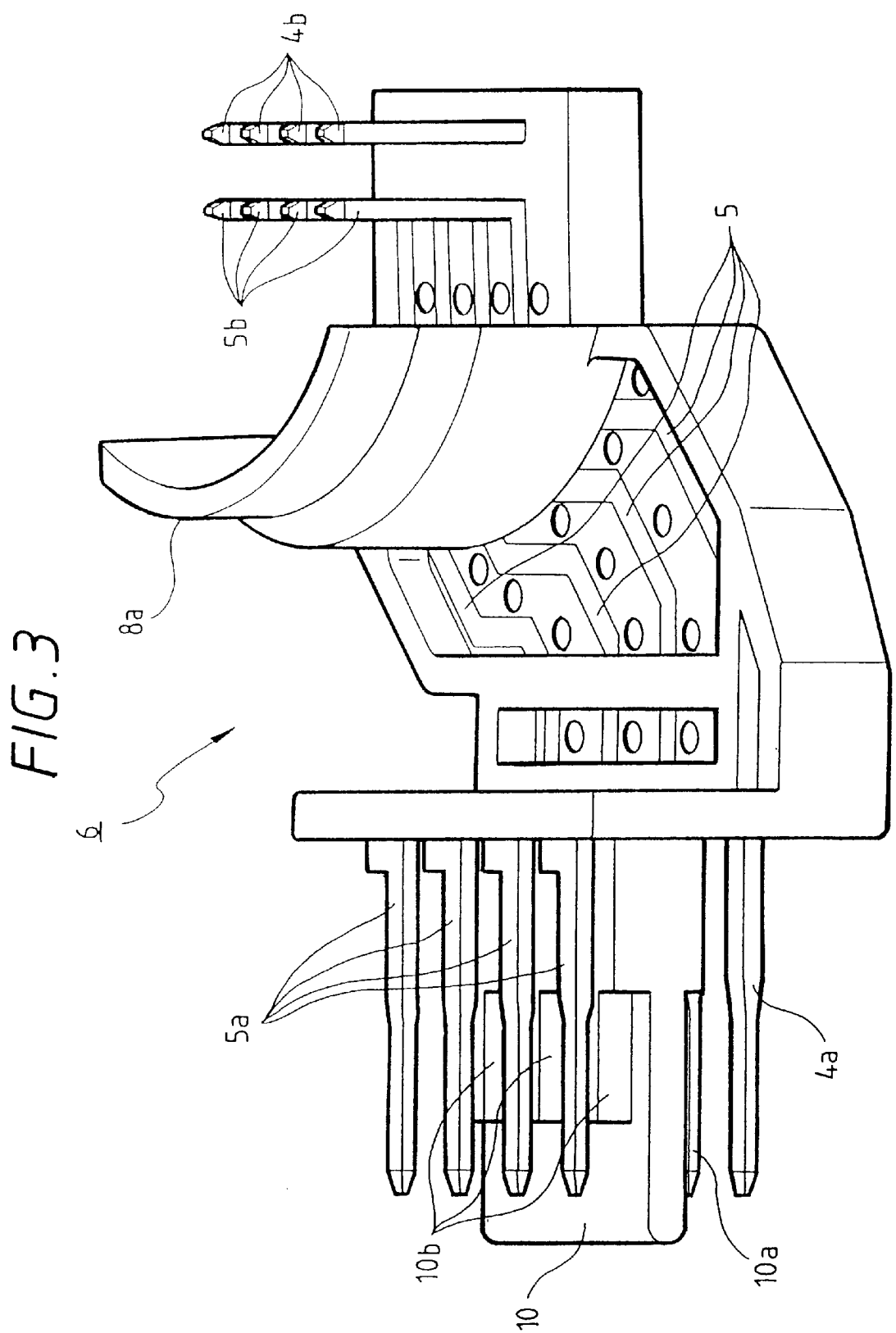
FIG. 3 is a perspective view of a primary molded body in FIG. 1.

At a first stage of the method of molding the connector 1, the plurality of male metal terminals 4 and 5 are kept insulated from one another, and in this condition these metal terminals are insert molded, thereby forming a primary molded body 6 (see FIG. 3). At the time of this primary molding, a guide plate 10, which performs its function when fitting the mating connector, is formed between the first connection portions 4a of the male metal terminals 4 and the first connection portions 5a of the male metal terminals 5. Ribs 10a are formed on one side of the guide plate 10 while ribs lob are formed on the other side, the ribs 10a and 10b extending in a direction of fitting of the mating connector. The provision of these ribs 10a and 10b allows the guide plate 10 to have a relatively small thickness.

Then, at a second stage, the primary molded body 6 is properly positioned, and is insert molded, thereby forming a secondary molded body 7 which is a final molded product (connector). In order to prevent the development of a shrink mark and a warp due to the formation of a thickened portion 8 of the connector 1, a core portion 8a of the thickened portion 8 is formed at the time of molding the primary molded body 6, and a shell portion 8b of the thickened portion 8, having a generally uniform thickness of 1 mm to 2 mm, is formed at the time of molding the secondary molded body 7.

Namely, in the method of molding the connector 1 of the above construction, the plurality of (eight) male terminals 4 and 5 are positioned in a primary mold in such a manner that these terminals are kept out of contact with each other, that is, spaced predetermined distances from one another, and then a synthetic resin (molding material) is filled in the primary mold, and is cured, thereby forming the primary molded body 6. The core portion 8a of the thickened portion 8 is molded at this time (see FIG. 3).

Then, the primary molded body 6 is properly positioned in a secondary mold, and then a synthetic resin is filled in the secondary mold, thereby forming the secondary molded body 7. At this time, the first and second connection portions of the male metal terminals 4 and 5, exposed from the primary molded body 6, and the core portion 8a are utilized for the positioning for the secondary molding, and the shell portion 8b of the thickened portion 8 of the housing 2 (final molded product) is molded at this time (see FIG. 1).

Thus, the whole of the thickened portion 8 is not molded at one time during one molding step (that is, the step of forming the primary molded body 6 or the step of forming the secondary molded body 7), and therefore the development of a shrink mark and a warp in the housing 2 is prevented, and besides since the core portion 8a of the primary molded body 6 is utilized for the positioning for the secondary molding, the positioning of the male metal terminals 4 and 5 can be effected highly precisely. Therefore, the number of the defective connectors 1 can be reduced, so that the yield is enhanced.

As described above, in the connector molding method of this embodiment, the core portion 8a of the thickened portion 8 is molded at the time of molding the primary molded body 6, and the shell portion 8b of the thickened portion 8, having a generally uniform thickness of 1 mm to 2 mm, is molded at the time of molding the secondary molded body 7. Thus, the whole of the thickened portion 8 is not molded at a time at one molding step (that is, the step of forming the primary molded body 6 or the step of forming the secondary molded body 7). Therefore, a shrink mark and a warp are positively prevented from developing in the housing 2 of the connector 1 (the molded product), thus preventing the production of the defective connector, and therefore the yield can be enhanced.

The first and second connection portions 4a and 4b of each male metal terminal 4, as well as the first and second connection portions 5a and 5a of each male metal terminal 5, project from the opposite ends of the primary molded body 6, respectively, and therefore the accurate positioning can be easily effected, and the molding is effected in such a manner that the terminals are positively kept insulated from one another.

Therefore, the metal terminals can be more positively held in the mold as compared with the case where the connector 1 is molded at a time by the use of one mold, and the male metal terminals 4 and 5 will not be displaced out of position by jets of the molding material during the molding operation, and the connector of a high reliability can be obtained.

The core portion 8a of the primary molded body 6 is utilized for the positioning for the secondary molding, and by doing so, the male metal terminals 4 and 5 can be highly precisely positioned, and the yield can be enhanced, and also the connector of a high reliability can be obtained.

The present invention is not limited to the above embodiment, but various modifications can be made. For example, in the above embodiment, although the axes of the two fitting recesses 3a and 3b are disposed perpendicular to each other, the present invention can be applied to the type of connector in which such fitting recesses are disposed on a common straight line, and are open away from each other.

As described above, in the connector molding method of the present invention, the core portion of the thickened portion of the housing is molded at the time of molding the primary molded body, and the shell portion of the thickened portion, having a generally uniform thickness, is molded at the time of molding the secondary molded body.

Thus, the whole of the thickened portion is not molded at a single molding step (that is, the step of forming the primary molded body or the step of forming the secondary molded body), and therefore, a shrink mark and a warp are prevented from developing in the housing. An addition, since the core portion of the primary molded body is utilized for the positioning for the secondary molding, the metal terminals can be positioned highly precisely. Therefore, the number of the defective connectors can be reduced, and the yield can be enhanced, and the connector of a high reliability can be obtained.

What is claimed is:

1. A method of molding a connector including a housing having fitting recesses and including a thickened portion of the housing which comprises a core portion and a shell portion which are molded in separate steps, comprising the steps of:

molding a primary molded body of housing while holding a plurality of male metal terminals so the male metal terminals are embedded in the primary molded body;

the molding of the primary molded body further including a core portion molding step wherein the core portion is molded so as to extend from the primary molded body and parallel to one of the fitting recesses;

positioning the primary molded body in a secondary mold, wherein the core portion facilitates the positioning step of the primary molded body into the secondary mold;

molding a secondary molded body to the primary molded body wherein the fitting recesses are formed at opposite ends during the secondary molding step, for receiving mating terminals in the housing;

the molding of the secondary molded body further including a shell portion molding step wherein the shell portion is molded to coat inner and outer sides of the core portion, and forming a connector wherein the thickened portion of the housing facilitates mounting of the housing to a separate member.

2. A method of molding a connector according to claim 1, wherein the thickened portion is adjacent to one of the fitting recesses.

3. A method of molding a connector according to claim 1, wherein the generally uniform thickness of the shell portion is 1 to 2 mm.

4. A method of molding a connector according to claim 1, wherein the fitting recesses are aligned along the same axial line so as to open away from each other.

5. A method of molding a connector according to claim 1, wherein the fitting recesses are aligned along perpendicular axial lines so as to open away from each other at a right angle.

* * * * *